(12) United States Patent
Yu et al.

(10) Patent No.: US 10,321,426 B2
(45) Date of Patent: Jun. 11, 2019

(54) APPARATUS AND METHOD FOR DETECTING SYNCHRONIZATION AND SIGNALS USING BLOCK DATA PROCESSING

(75) Inventors: Chang Wahn Yu, Daejeon (KR); Youn Ok Park, Daejeon (KR); Chong Hyun Lee, Jeju-si (KR); Jun-Woo Kim, Daejeon (KR); Seungjae Bahng, Daejeon (KR); Byung-Han Ryu, Daejeon (KR); Jung Pil Choi, Daejeon (KR); Young Jo Bang, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 2507 days.

(21) Appl. No.: 12/906,496

(22) Filed: Oct. 18, 2010

(65) Prior Publication Data

US 2018/0279245 A1    Sep. 27, 2018

(30) Foreign Application Priority Data

Oct. 20, 2009   (KR) .................. 10-2009-0099664
Dec. 4, 2009    (KR) .................. 10-2009-0119968
Apr. 30, 2010   (KR) .................. 10-2010-0040843
Oct. 6, 2010    (KR) .................. 10-2010-0097502

(51) Int. Cl.
*H04J 3/06*     (2006.01)
*H04W 56/00*    (2009.01)

(52) U.S. Cl.
CPC ..... *H04W 56/004* (2013.01); *H04W 56/0055* (2013.01)

(58) Field of Classification Search
CPC .. H04B 7/2125; H04B 7/2126; H04B 7/2662; H04L 5/0007; H04L 27/08; H04L 27/206;
(Continued)

(56) References Cited

U.S. PATENT DOCUMENTS 6,907,270 B1   6/2005  Blanz
8,170,152 B2 * 5/2012  Mody ................ H04L 27/0012
                                                   370/210

(Continued)

FOREIGN PATENT DOCUMENTS

KR    10-2005-0066562 A    6/2005
KR       10-0810180 B1     3/2008

OTHER PUBLICATIONS

Fu-Sheng Lu, Cheng-Xu Yang, and Pai-Ling Lin, An Improved Wigner Distribution Based Algorithm for Signal Identification, IEEE UT'04, pp. 39-45, Apr. 23, 2004.

(Continued)

*Primary Examiner* — Frank Duong
(74) *Attorney, Agent, or Firm* — Jefferson IP Law, LLP

(57) ABSTRACT

An apparatus and method for detecting synchronization and signals using block data processing in a receiving system are provided. To process an input signal, a cumulative matrix is obtained from an input vector signal for each frame generated from the signal. A primary eigenvector is extracted from the cumulative matrix, and the maximum value of a correlation vector is calculated from the extracted primary eigenvector. A time delay is detected by comparing the calculated maximum value of the correlation vector with a first threshold value, and a delay correlation vector is calculated from the detected time delay. Finally, synchronization and signals are detected by comparing the calculated delay correlation vector with a second threshold value.

20 Claims, 11 Drawing Sheets

(58) Field of Classification Search
CPC ...... H04J 3/0632; H04J 3/0638; H04J 3/0685; H04J 2011/0096; H04W 56/001; H04W 56/004; H04W 56/0045; H04W 56/0055
See application file for complete search history.

(56) References Cited

U.S. PATENT DOCUMENTS

2010/0015935 A1* 1/2010 Zeng .................. H04B 17/345
455/206
2011/0286555 A1* 11/2011 Cho ..................... H04L 25/021
375/343

OTHER PUBLICATIONS

Y. Zeng et al., Maximum Eigenvalue Detection: Theory and Application, IEEE ICC 2008, pp. 4160-4164, May 23, 2008.
C. Sengupta, Algorithms and architectures for channel estimation in wireless CDMA communication systems, PhD Thesis, Rice University, Dec. 31, 1998.

* cited by examiner

APPARATUS AND METHOD FOR DETECTING SYNCHRONIZATION AND SIGNALS USING BLOCK DATA PROCESSING

PRIORITY

This application claims the benefit under 35 U.S.C. § 119(a) of a Korean patent application filed in the Korean Intellectual Property Office on Oct. 20, 2009 and assigned Serial No. 10-2009-0099664, a Korean patent application filed in the Korean Intellectual Property Office on Dec. 4, 2009 and assigned Serial No. 10-2009-0119968, a Korean patent application filed in the Korean Intellectual Property Office on Apr. 30, 2010 and assigned Serial No. 10-2010-0040843, and a Korean patent application filed in the Korean Intellectual Property Office on Oct. 6, 2010 and assigned Serial No. 10-2010-0097502, the entire disclosures of each of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) the Electronics and Telecommunications Research Institute (ETRI).

BACKGROUND OF THE INVENTION

1. Field of the Invention

The present invention relates to a synchronization and signal detection apparatus and method. More particularly, the present invention relates to an apparatus and method for detecting synchronization and signals using block data processing in a receiving system.

2. Description of the Related Art

The communications market has blossomed in recent years in line with the remarkable development in information and communication technologies. Particularly, the standardization of the mobile internet Wireless Broadband (WiBro) technology, that is, a mobile WiMax, for the IEEE 802.16 standard is currently actively being pursued. WiBro ensures intermediate to low speed mobility of about 60 Km/h in terms of mobility and supports a speed of 3 Mb/s in terms of data transfer rate. Thus, WiBro can be viewed as a transitional system that appears in the course of evolution towards fourth-generation mobile communication.

WiBro-Evolution is a system that is currently being standardized in the IEEE 802.16m standard and is targeted for the mobile broadband market. The use of WiBro-Evolution can improve transmission capacity or channel capacity compared to the conventional WiBro system, and also can support high-speed mobility of 300 Km/h.

In recent years, the design and technology development of a communication system in a mobile environment considering a Tactical Information and Communication Network (TICN) is emerging as an important issue. That is, as for an Over The Air Receiver (OTAR) technology, unlike the conventional system using a fixed base station, system development considering On The Move (OTM) under the TICN situation where a base station varies has emerged as an important issue.

An important issue under this environment is to detect a weak signal and timing synchronization and use them as important means of communication. That is, there is a growing importance of an algorithm that detects initial system synchronization, signal-to-noise ratio, signal-to-interference ratio, CELL ID, frequency, etc. when noise and interference are very high.

The conventional methods have been studied mainly in a fixed environment, rather than in an OTM environment. Moreover, studies have been performed in a relatively low-noise environment, and methods of detecting a signal using the autocorrelation of sequences of preambles have been used as representative methods. However, the methods based on autocorrelation have some limitations, so a new detection algorithm for overcoming these limitations is required.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively detecting synchronization and signals even in a poor communication environment through a new synchronization and signal detection algorithm based on matrix processing.

In accordance with an aspect of the present invention, an apparatus for processing a signal is provided. The apparatus includes a vector/matrix generation unit for generating a cumulative matrix from a signal vector for each input frame, a primary eigenvector extraction unit for extracting a primary eigenvector from the cumulative matrix output from the vector/matrix generation unit, a correlation vector calculation unit for calculating a correlation value between a time transition matrix and the primary eigenvector output from the primary eigenvector extraction unit, and for outputting a vector of the calculated correlation value, a time delay detection unit for detecting a synchronization time by comparing the maximum value of the vector output from the correlation vector calculation unit with a first threshold value, and for outputting a delay time from the detected synchronization time, a time delay vector calculation unit for calculating a correlation value between a reference transition matrix delayed by the delay time value detected by the time delay detection unit and the primary eigenvector extracted by the primary eigenvector extraction unit, and for outputting a value of an output vector, and a signal detection unit for detecting current synchronization and signals by comparing the value of the output vector of the time delay vector calculation unit with a second threshold value.

In accordance with another aspect of the present invention, a method for processing a signal is provided. The method includes obtaining a cumulative matrix from a vector signal for each frame generated and input from the signal, extracting a primary eigenvector from the cumulative matrix, calculating the maximum value of a correlation vector from the extracted primary eigenvector, detecting a time delay by comparing the calculated maximum value of the correlation vector with a first threshold value, calculating a delay correlation vector from the detected time delay, and detecting synchronization and signals by comparing the calculated delay correlation vector with a second threshold value.

In accordance with yet another aspect of the present invention, an apparatus for processing a signal is provided. The apparatus includes a vector/matrix generation unit for generating cumulative matrixes from signal vectors for each input frame, a primary eigenvector extraction unit for extracting a primary eigenvector from among eigenvectors corresponding to the cumulative matrixes output from the vector/matrix generation unit, a correlation vector calculation unit for calculating correlation values between a preset reference matrix including characteristic information of a transmitted signal and the primary eigenvector, and for outputting vectors of the calculated correlation value, and a signal detection unit for detecting current signals by comparing the vectors of the calculated correlation value and a preset threshold value.

In accordance with yet another aspect of the present invention, a method for processing a signal is provided. The method includes obtaining cumulative matrixes from a vector signal for each frame generated and input from the signal, extracting a primary eigenvector from among eigenvectors corresponding to the cumulative matrixes, calculating correlation values between a preset reference matrix including characteristic information of a transmitted signal and the primary eigenvector, and outputting vectors of the calculated correlation value, and detecting signals by comparing the vectors of the calculated correlation value and a preset threshold value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art would recognize that various changes and modifications of the embodiments described herein can be made without departing from the spirit or scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, unless explicitly described to the contrary, the word "comprise" and variations such as "comprises" or "comprising," will be understood to imply the inclusion of stated elements but not the exclusion of any other elements.

Hereinafter, an apparatus and method for detecting synchronization and signals based on block data processing will be described with reference to the accompanying drawings.

Figure 1:
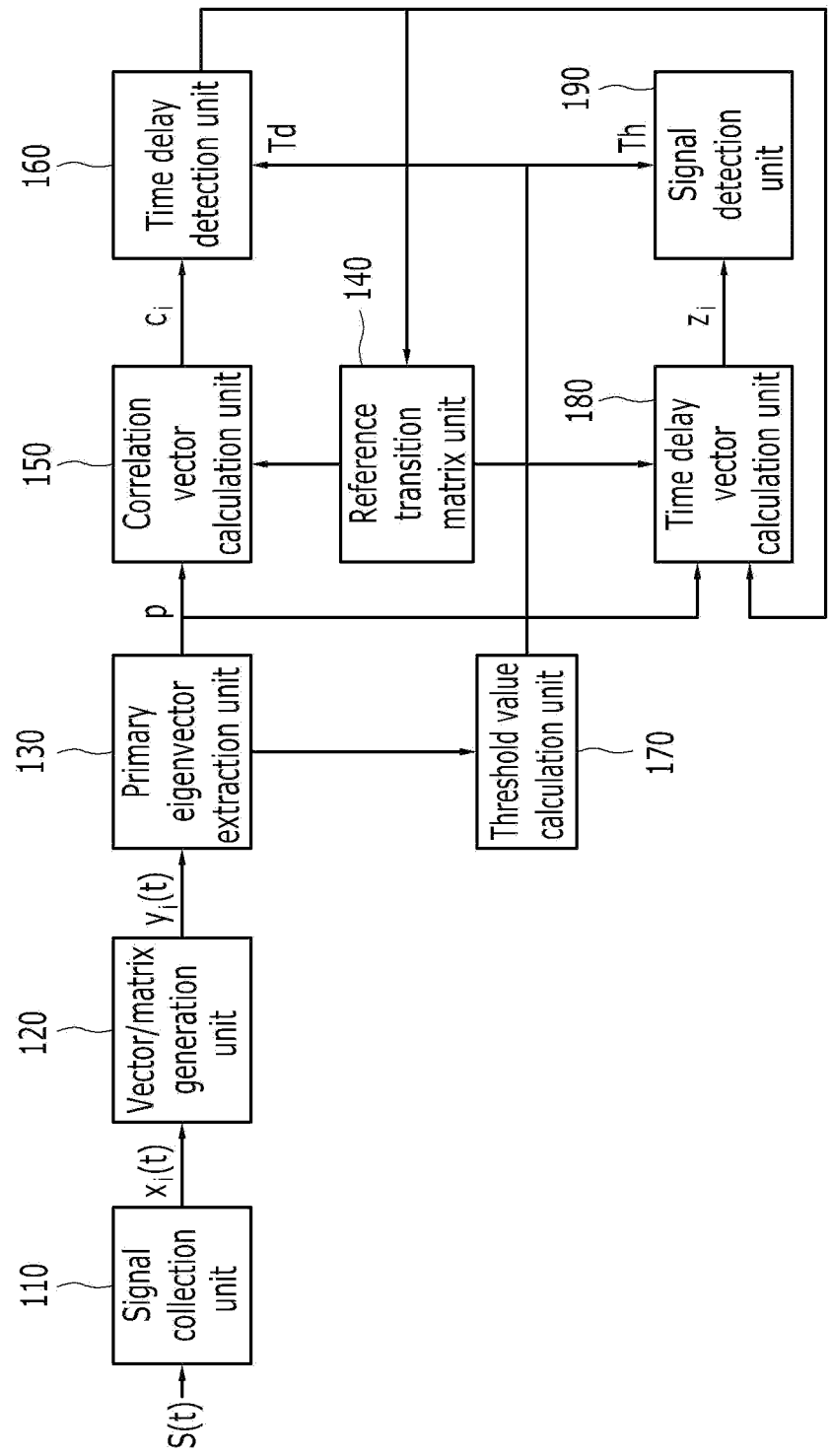
FIG. 1 is a structural view of a signal processing apparatus according to an exemplary embodiment of the present invention.

FIG. 1 is a structural view of a signal processing apparatus according to an exemplary embodiment of the present invention.

Referring to FIG. 1, the signal processing apparatus based on block data processing includes a signal collection unit 110, a vector/matrix generation unit 120, a primary eigenvector extraction unit 130, a reference transition matrix unit 140, a correlation vector calculation unit 150, a time delay detection unit 160, a threshold value calculation unit 170, a time delay vector calculation unit 180, and a signal detection unit 190.

The signal collection unit 110 outputs an input signal as a signal vector for each frame having a preset length. That is, after an input signal s(t) input into the signal processing apparatus 100 is received, a signal vector xi (i=1:M) for each frame having a preset length L is output.

The vector/matrix generation unit 120 obtains a new cumulative vector $y_i$ (i=1:M) and a new cumulative matrix Y using the signal vector $x_i$ for each frame output from the signal collection unit 110. Here, the new cumulative matrix Y and the new cumulative vector $y_i$ are obtained by the following Equations 1 and 2:

$$y_1 = x_1$$
$$y_i = y_{i-1} + x_i, \; i=2:M \quad \text{[Equation 1]}$$

Where M denotes the number of frames.

$$Y = [y_1 \; y_2 \ldots y_M] \quad \text{[Equation 2]}$$

The primary eigenvector extraction unit 130 extracts a primary eigenvector p, which is the most dominant eigenvector, by performing matrix processing of the cumulative vector $y_i$ obtained in the vector/matrix generation unit 120. Here, the most dominant eigenvector denotes the vector with the highest eigenvalue. That is, eigenvectors have their respective eigenvalues, and the eigenvector with the highest eigenvector among a plurality of eigenvectors is referred to as a dominant eigenvector.

Regarding the distribution of such eigenvectors, the eigenvectors are divided into high eigenvalues and low eigenvalues with respect to a given eigenvalue. Based on this division, eigenvectors with high eigenvalues appear in a signal space, and eigenvectors with low eigenvalues appear in a noise space. Therefore, the primary eigenvector p serves to divide a cumulative vector into a noise space and a signal space.

At this point, various algorithms (e.g., Eigenvalue Decomposition (EVD), Singular Value Decomposition (SVD), LU Decomposition (LUD), QR Decomposition (QRD), Cholesky Decomposition, Schur Decomposition, and Biconjugate Decomposition) may be applied to perform matrix processing of the cumulative vector. An exemplary embodiment of the present invention has been described, taking as an example the use of SVD as shown in the following Equation 3, but is not necessarily limited thereto.

$$[USV] = \text{svd}(Y)$$
$$p = U_{:,1} \quad \text{[Equation 3]}$$

Where svd denotes an SVD process, and p denotes a primary eigenvector extracted by Equation 3. As the SVD process is already known, a detailed description thereof will be omitted in exemplary embodiments of the present invention.

The reference transition matrix unit 140 stores a reference transition matrix previously generated for a transmitted signal, i.e., a signal input into the signal collection unit 110. Here, the reference transition matrix is used to calculate a correlation value between the primary eigenvector extracted by the primary eigenvector extraction unit 130 and a vector value resulting from the calculation by the correlation vector calculation unit 150 according to Equation 7 to be described below. The reference transition matrix is represented by the following Equation 4, and the reference transition matrix is used as a reference matrix for time delay and signal detection.

$$R = [r_1 \; r_2 \ldots R_K] \quad \text{[Equation 4]}$$

Where K denotes the number of signals to be detected based on time delay processing, and $r_i$ i=1:K denotes the i-th reference signal vector.

Moreover, the reference transition matrix unit 140 generates a time transition matrix from the stored reference transition matrix. The reference transition matrix stored in the reference transition matrix unit 140 is an information matrix consisting of signals known at the time of configuration of a communication network, and, for example, may be a vector of a preamble or pilot signal. Such a time transition matrix is generated using the following Equation 5.

$$R(-j) = [r_1(-j) r_2(-j) \ldots r_K(-j)], j=0:J-1 \quad \text{[Equation 5]}$$

Where K denotes a transition time, and J denotes the maximum delay time. The $r_1(-j)$ vector shifted by time j is as shown in the following Equation 6.

$$r_1(-j) = [r_i(j) r_i j+1 \ldots r_i(L-j)] \quad \text{[Equation 6]}$$

The correlation vector calculation unit 150 calculates a correlation between the primary eigenvector p extracted by the primary eigenvector extraction unit 130 and the time transition matrix output from the reference transition matrix unit 140, and outputs a vector of the calculated correlation value. The following Equation 7 is used to calculate the correlation, and the result of the correlation vector calculation unit 150 is vector c(j).

$$c(j) = p^T R(-j), j=0:J \quad \text{[Equation 7]}$$

Where T denotes a transposed matrix.

The time delay detection unit 160 detects a current synchronization time by comparing the maximum value of vector c(j) output from the correlation vector calculation unit 150 with a first threshold value Td received by the threshold value calculation unit 170 to be described later, and outputs a delay time from the detected synchronization time. The delay time detected by the time delay detection unit 160 is detected by comparison according to the following Equation 8.

If max $|c(j)| > Td, j=0, \ldots, J$

Detection of time delay j $d(n) = j$ end  [Equation 8]

Where Td denotes a first threshold value for time delay detection, and d(n) stores a detected time delay.

The threshold value calculation unit 170 calculates a first threshold value Td and a second threshold value Th to detect synchronization time and signals from an input signal by using the electric power of the input signal. Here, the first threshold value Td is used in order for the time delay detection unit 160 to calculate a delay time, and the second threshold value Th is used in order for the signal detection unit 190 to calculate a delay time.

There are various methods of calculating the first threshold value and the second threshold value. An exemplary embodiment of the present invention has been described with respect to an example in which the threshold values are calculated by the expression as shown in the following Equation 9, but not necessarily limited thereto.

$$Td = \beta |s(t)|^2$$
$$Th = \alpha |s(t)|^2 \quad \text{[Equation 9]}$$

Where $\alpha$ and $\beta$ denote constants selected according to a condition, and $|s(t)|^2$ denotes electric power.

The time delay vector calculation unit 180 receives the reference transition matrix delayed by a delay time value obtained by the time delay detection unit 160 and the primary eigenvector extracted by the primary eigenvector extraction unit 130, and calculates a correlation value between the delayed reference transition matrix and the primary eigenvector. The calculation is described as using the following Equation 10, but not necessarily limited thereto.

$$z = p^T R(-d(n)), \ n=1:N \quad \text{[Equation 10]}$$

The signal detection unit 190 detects current synchronization and signals by comparing a value of the output vector z(n) of the time delay vector calculation unit 180 with the second threshold value Th received from the threshold value calculation unit 170.

Before detecting synchronization and signals using such a signal processing apparatus, first of all, a simulation environment for detecting synchronization and signals will be described with reference to FIG. 2.

Figure 2:
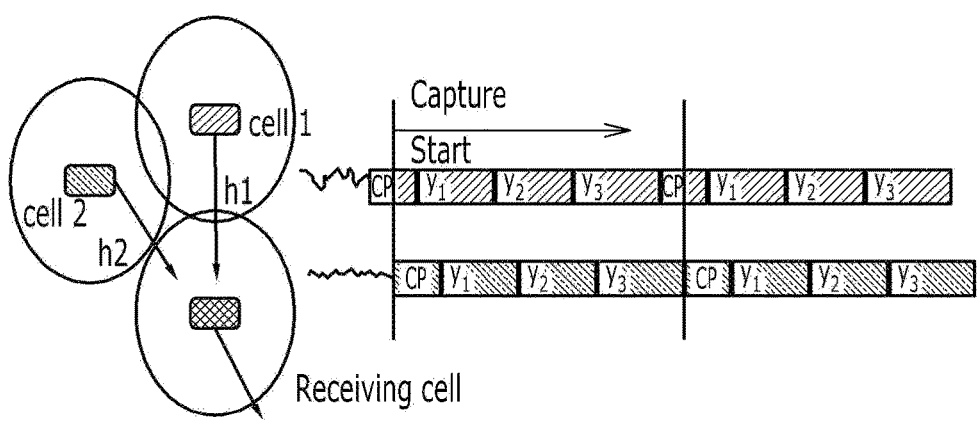
FIG. 2 is an illustration showing a simulation environment according to an exemplary embodiment of the present invention.

FIG. 2 is an illustration showing a simulation environment according to an exemplary embodiment of the present invention.

It is assumed that, under a certain environment, a receiving cell receives signals from two cells (a first cell (cell 1) and a second cell (cell 2)), respectively, and the respective cells have delay 2 (cell 1=2) and delay 4 (cell 1=4).

Referring to FIG. 2, if the receiving cell receives a signal h1 transmitted from the first cell and a signal h2 transmitted from the second cell, each reception is delayed by the delay of each cell. Accordingly, in order to detect synchronization and signals from these signals, an exemplary embodiment of the present invention will be described with reference to FIG. 3 with respect to a method for detecting synchronization and signals based on block data processing and detecting synchronization and signals using a signal processing apparatus.

Figure 3:
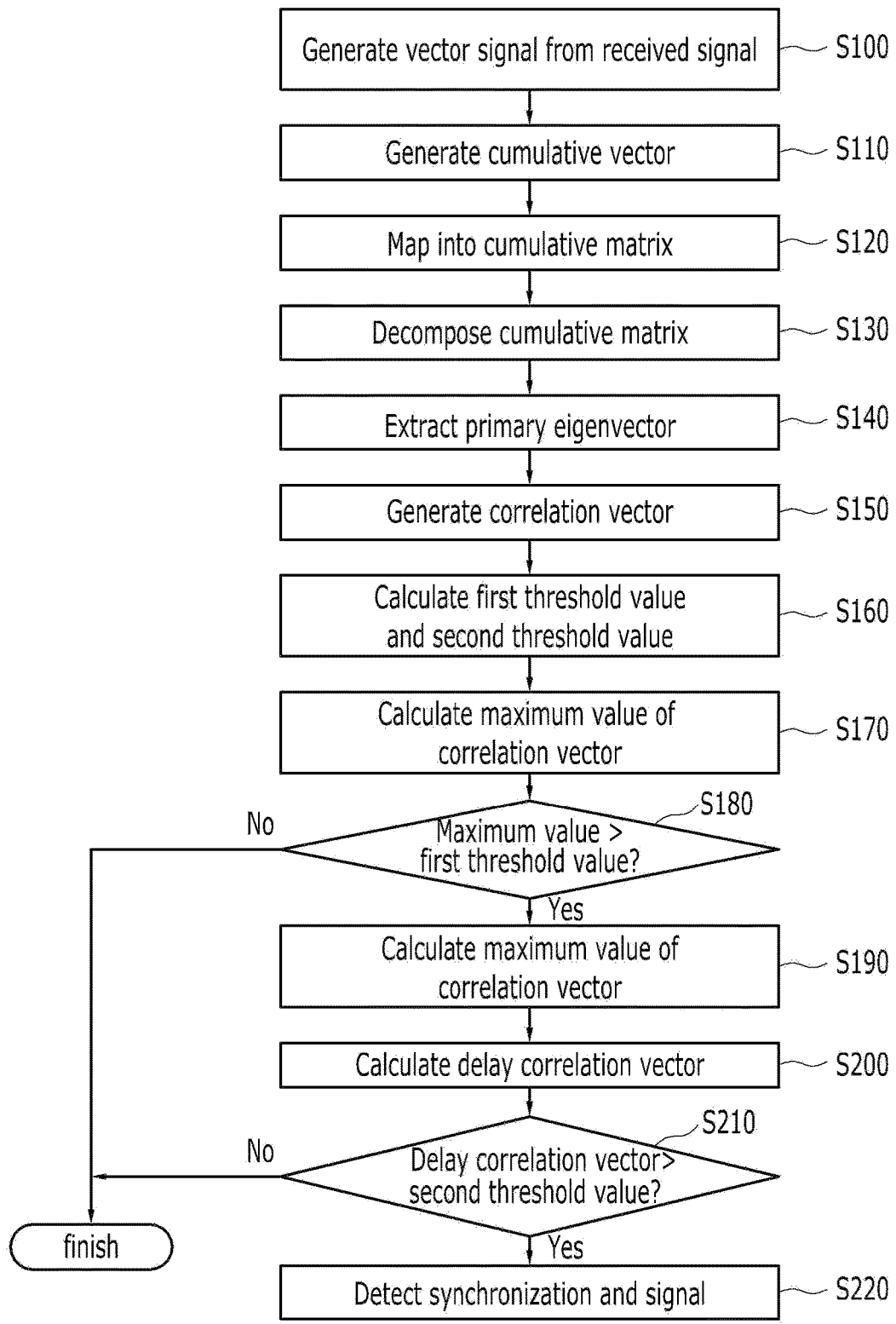
FIG. 3 is a flowchart showing a synchronization and signal detection method according to an exemplary embodiment of the present invention.

FIG. 3 is a flowchart showing a synchronization and signal detection method according to an exemplary embodiment of the present invention.

Referring to FIG. 3, the signal collection unit 110 converts an input signal s(t) into vector signals $x_1(t)$ to $x_M(t)$ for each frame in step S100. The form of the input signal is as shown in FIG. 4, and the form of the input signal will be described first.

Figure 4:
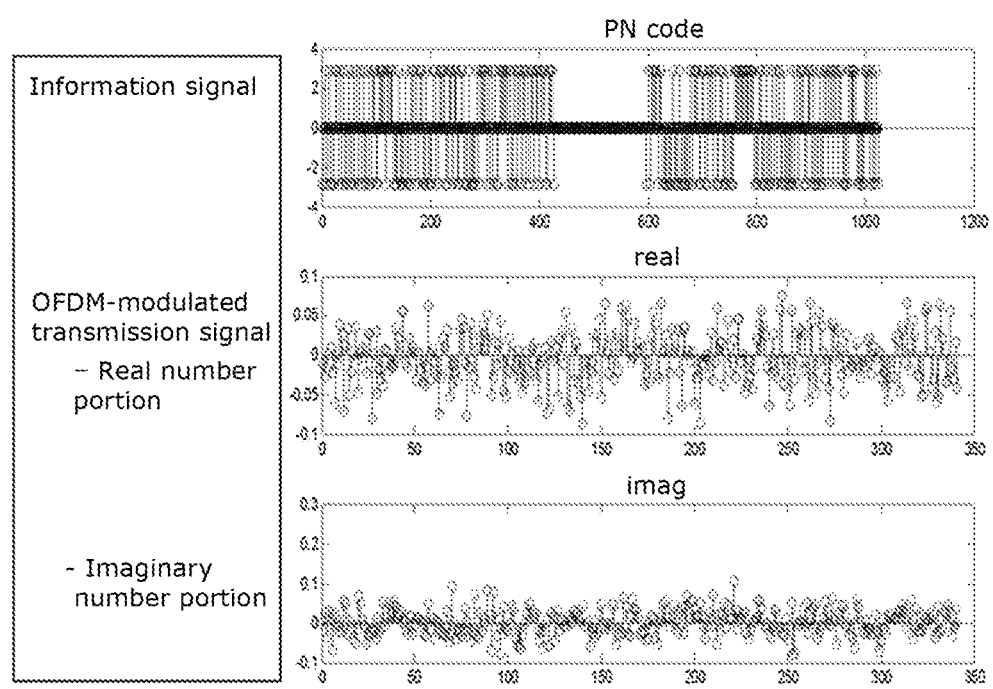
FIG. 4 is an illustration showing a signal and an Orthogonal Frequency-Division Multiplexing (OFDM) transmission signal according to an exemplary embodiment of the present invention.

FIG. 4 is an illustration showing a signal and an OFDM transmission signal according to an exemplary embodiment of the present invention.

Referring to FIG. 4, signals input into the signal collection unit 110 include an information signal and an OFDM-modulated transmission signal, and the OFDM-modulated transmission signal is divided into a real number portion and an imaginary number portion. This signal is input in mixture with a transmission signal and a background noise signal, as shown in FIG. 5, depending on a channel environment.

Figure 5:
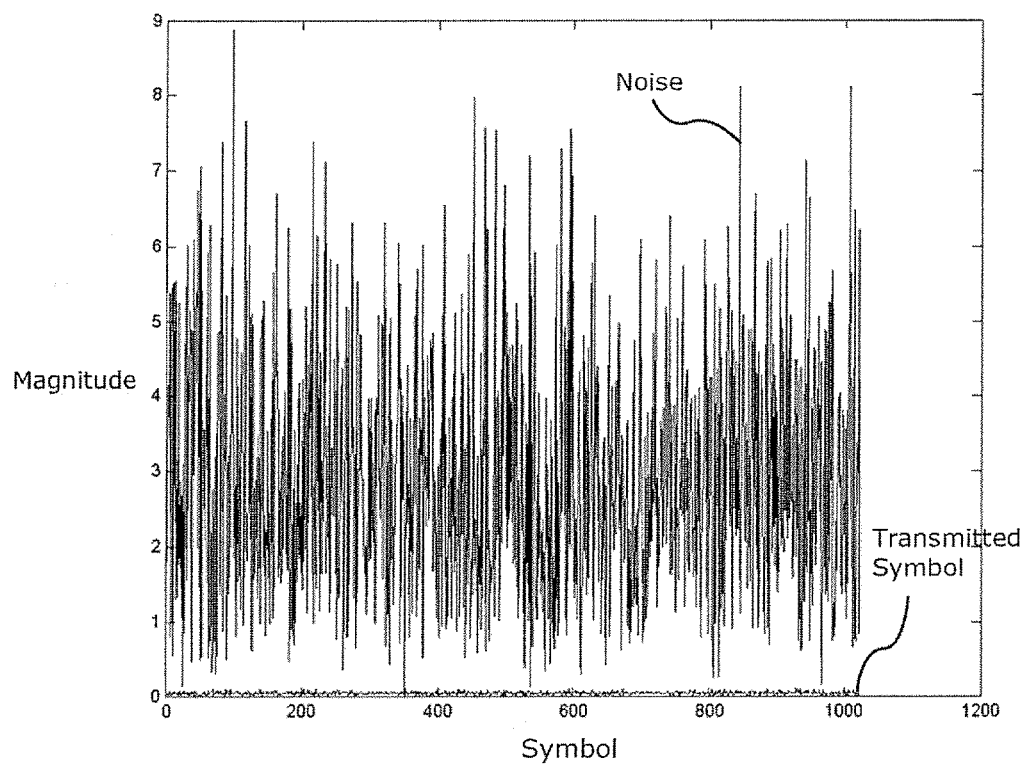
FIG. 5 is an illustration showing the magnitude of a transmission signal and a background noise signal in a poor channel environment for applying an exemplary embodiment of the present invention.

FIG. 5 is an illustration showing magnitudes of a transmission signal and a background noise signal in a poor channel environment according to an exemplary embodiment of the present invention.

Referring to FIG. 5, the magnitude of the background noise signal is much greater than the magnitude of the transmission signal when signals are transmitted in a poor channel environment. Thus, it is difficult to extract information in the transmission signal even if the transmission signal is input into a receiving system.

Referring back to FIG. 3, the vector/matrix generation unit 120 receives the vector signals for M frames converted by the signal collection unit 110 and converts them into a cumulative vector in step S110, and maps the converted cumulative vector into a cumulative matrix Y in step S120. Then, the vector/matrix generation unit 120 decomposes the cumulative matrix Y in step S130. When the vector/matrix generation unit 120 decomposes the cumulative matrix in step S130, the primary eigenvector extraction unit 130 extracts the primary eigenvector P from the decomposed cumulative matrix in step S140.

The correlation vector calculation unit 150 multiplies the primary eigenvector extracted in step S140 by a reference matrix generated by the reference transition matrix unit 140 and a transition matrix R(-j) to output a correlation vector in step S150. At this point, the transition matrix R(-j) used for the correlation vector calculation unit 150 to calculate a correlation vector in step S150 is a time transition matrix that the reference transition matrix unit 140 generates by shifting the reference matrix. The step of generating a reference matrix and the step of generating a time transition matrix by shifting the reference matrix will not be shown in the drawings.

At this point, the reference matrix is a prior information matrix of a transmitted signal, and the prior information matrix refers to an information matrix consisting of signals known at the time of configuration of a communication network, i.e., a vector of a preamble or pilot signal. The threshold value calculation unit 170 calculates noise power using the cumulative vector generated in step S110, and outputs the first threshold value Td and the second threshold value Th in step S160.

The correlation vector calculation unit 150 calculates the maximum value of a correlation vector through a maximum correlation calculation process in step S170, and determines whether the maximum value of the correlation vector is greater than the first threshold value output in step S160 in step S180. If it is determined that the maximum value of the correlation vector is greater than the threshold value, the time delay detection unit 160 detects a delay time value, and the detected delay time value is stored in d(n) in step S190.

The time delay vector calculation unit 180 calculates a delay correlation vector by multiplying the delay time value extracted in step S190 with the primary eigenvector extracted by the primary eigenvector extraction unit 130 in step S140 in step S200. The signal detection unit 190 determines in step S210 whether the delay correlation vector calculated by the time delay vector calculation unit 180 is greater than the second threshold value Th calculated by the threshold value calculation unit 170 in step S160, and if it is determined in step S210 that the delay correlation vector is greater than the threshold value, the signal detection unit 190 detects synchronization and signals in step S220.

An example of delay time detection performed by the above procedure will be described with reference to FIG. 6.

Figure 6:
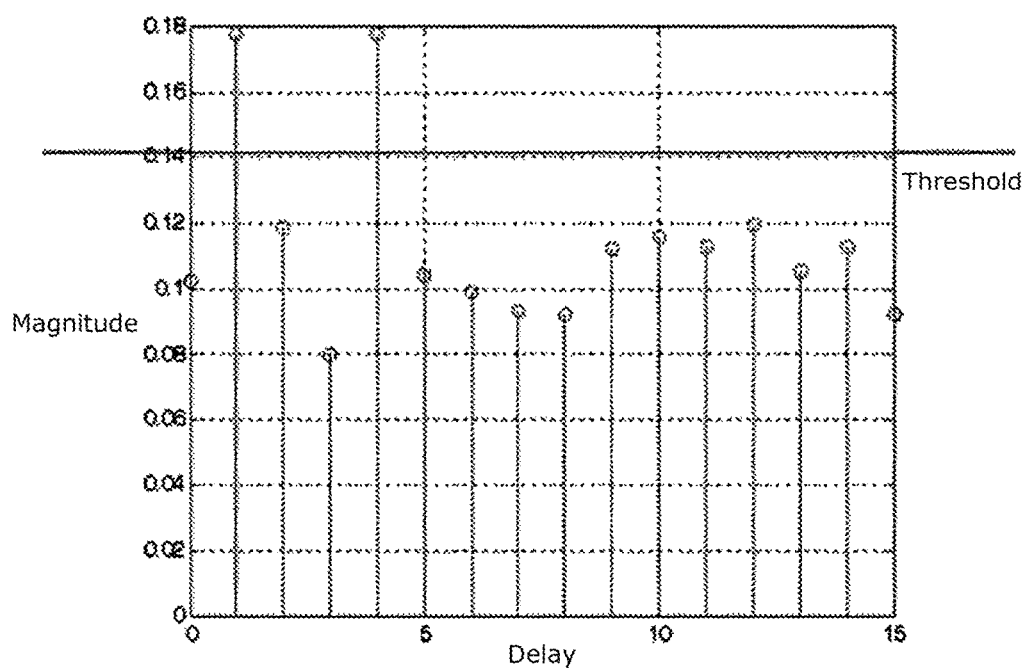
FIG. 6 is an illustration of delay time detection according to an exemplary embodiment of the present invention.

FIG. 6 is an illustration of delay time detection according to an exemplary embodiment of the present invention.

Referring to FIG. 6, a first threshold value Td is set to about 0.14 to detect a delay time. As a result, it can be seen that signals delayed in time by 2 and 4 are detected.

An exemplary embodiment for detecting signals using a delay time detected based on a threshold value will be described with reference to FIGS. 7 to 9.

Figure 7:
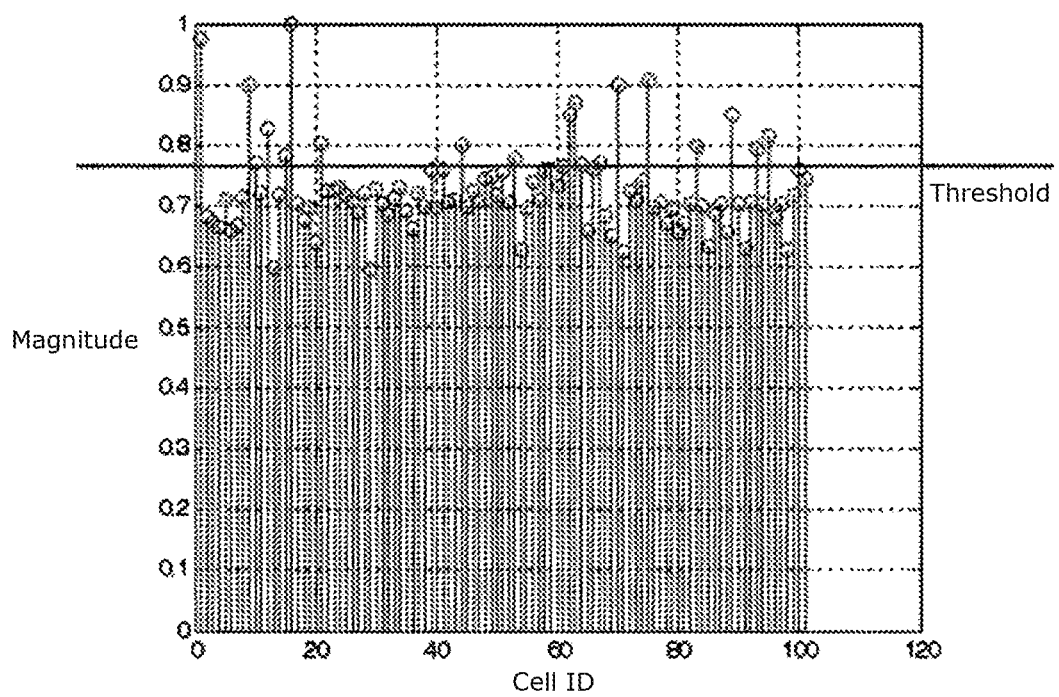
FIG. 7 is an illustration for performing conventional signal detection according to the related art.

FIG. 7 is an illustration for performing conventional signal detection according to the related art. FIG. 8 is an illustration for performing signal detection using a first detected delay time according to an exemplary embodiment of the present invention, and FIG. 9 is an illustration for performing signal detection using a second detected delay time according to an exemplary embodiment of the present invention.

Referring to FIG. 7 an illustration is described of signals that are detected using a conventional method, i.e., simply by using the correlation between the signals and setting the second threshold value Th to about 0.78. As shown in FIG. 7, the conventional method has difficulties in setting a threshold value and correctly detecting a cell ID even when a threshold value is set.

Figure 8:
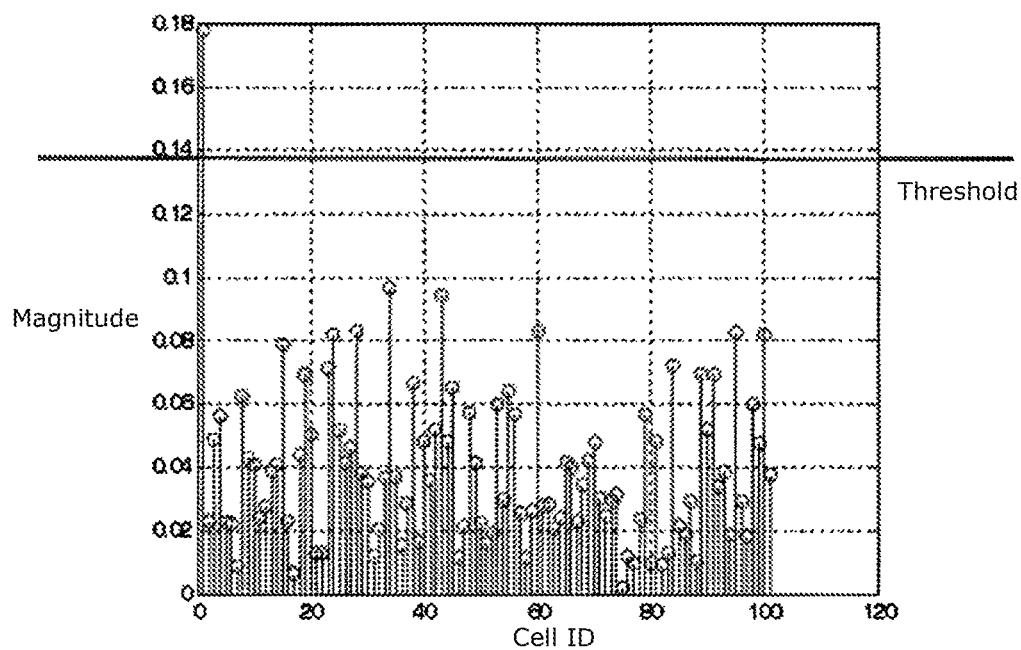
FIG. 8 is an illustration for performing general signal detection using a first detected delay time according to an exemplary embodiment of the present invention.
Figure 9:
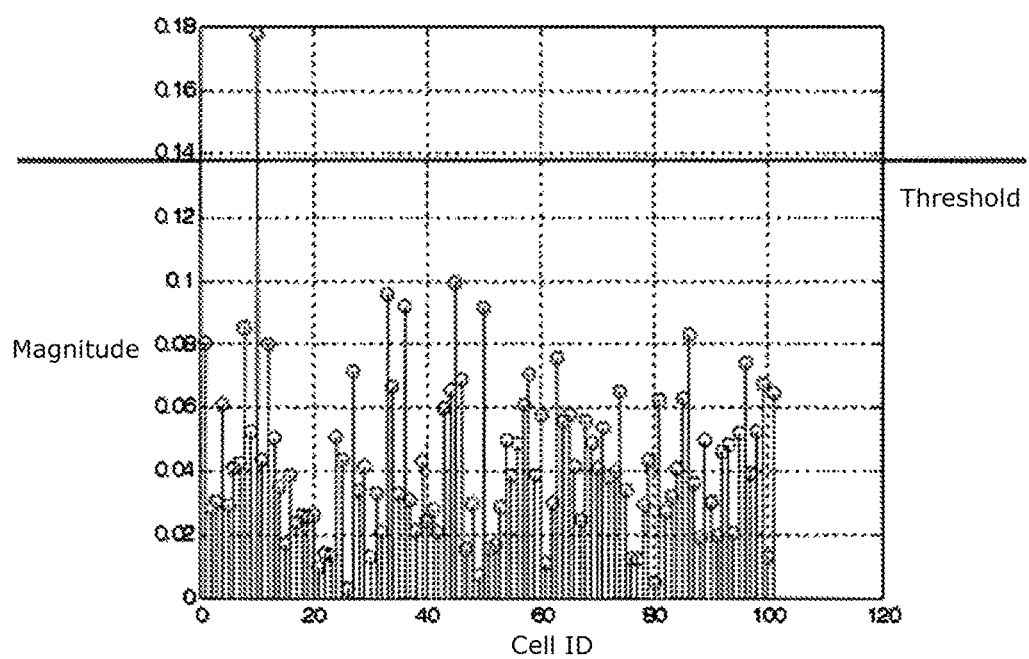
FIG. 9 is an illustration for performing signal detection using a second detected delay time according to an exemplary embodiment of the present invention.

Accordingly, signal detection using a detected delay time is as shown in FIGS. 8 and 9.

FIG. 8 shows an illustration when signals are detected by using a first detected delay time, i.e., delay time 2, according to an exemplary embodiment of the present invention.

Referring to FIG. 8, it can be seen that a signal having a cell ID of 1 is detected when delay time 2 is used and the second threshold value Th is set to 0.14.

Meanwhile, referring to FIG. 9, it can be seen that a signal having a cell ID of 10 is detected by using a second detected delay time, i.e., delay time 4, and setting the second threshold value Th to 0.14.

Next, an apparatus and method for detecting synchronization and signals based on block data processing according to an exemplary embodiment of the present invention will be described with reference to the accompanying drawings.

The apparatus for detecting synchronization and signals based on block data processing according to an exemplary embodiment of the present invention has the same configuration as that of the above-described exemplary embodiment and its detailed description will be omitted.

Figure 10:
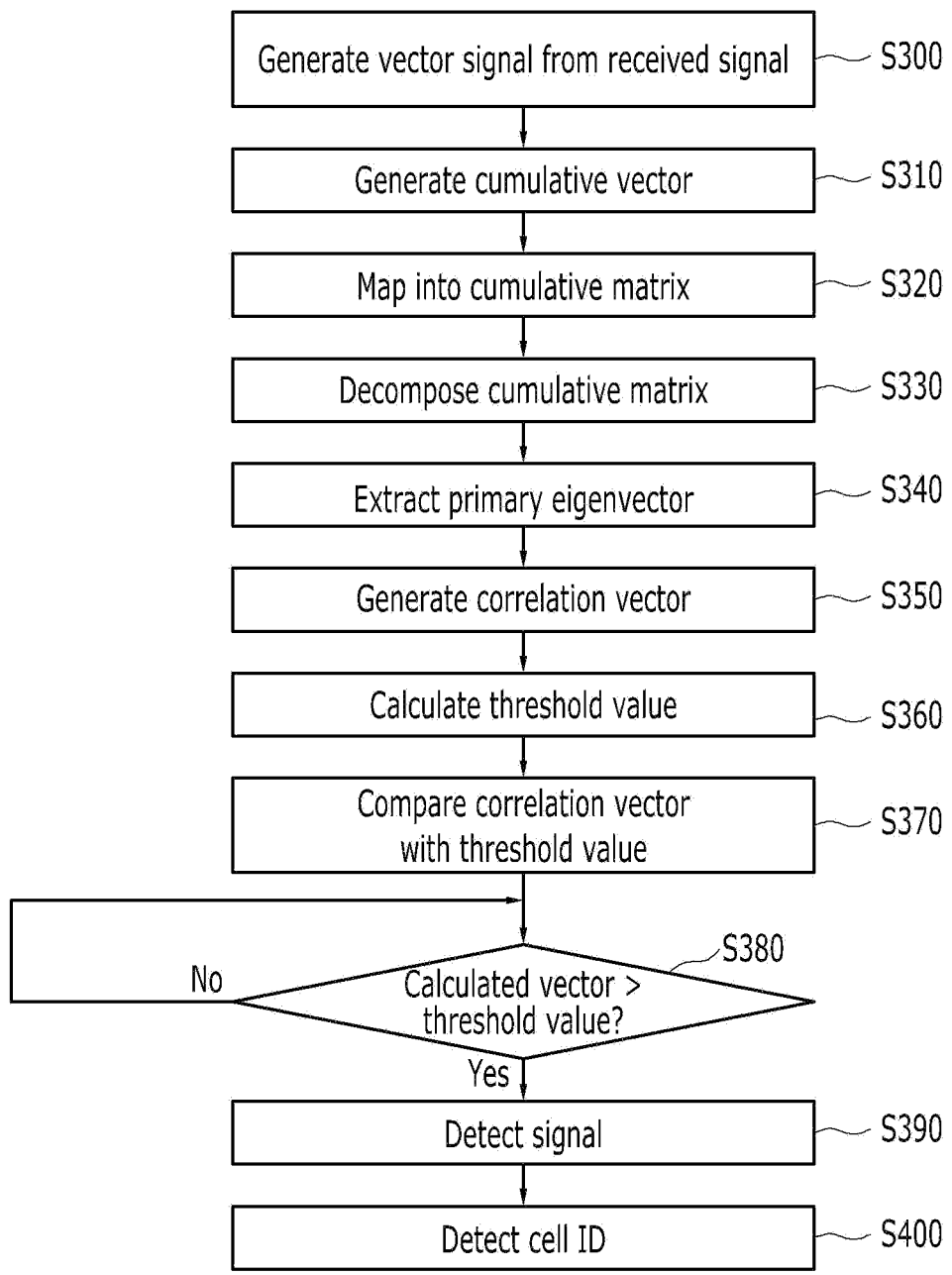
FIG. 10 is a flowchart showing a synchronization and signal detection method according to an exemplary embodiment of the present invention.

FIG. 10 is a flowchart showing a synchronization and signal detection method according to an exemplary embodiment of the present invention.

Referring to FIG. 10, as the method in FIG. 3, the correlation vector calculation unit 150 obtains a primary eigenvector and a reference matrix in steps S300 to S340. In an exemplary embodiment of the present invention, instead of calculating a correlation relation between a primary eigenvector p and a time transition matrix that is generated by shifting the reference matrix, the threshold value calculation unit 170 calculates a correlation between the primary eigenvector p and the reference matrix and outputs a vector of the calculated correlation value in step S350.

The following Equation 11 is used to calculate the correlation, and the result of the correlation vector calculation unit 150 is vector c(j).

$$c=[c_1\ c_2\ \ldots\ c_k]=p^T R \qquad \text{[Equation 11]}$$

Here, T denotes a transposed matrix.

The signal detection unit 190 compares the vector c(j) with a threshold value, that is, the second threshold value (Th) in steps S360 and S370. The signal detection unit 190 detects signals by comparison according to the following Equation 12.

$$\text{If } c_i > Th,\ i=1,\ldots, K$$

Detection of the i-th signal i end [Equation 12]

Here Th denotes a threshold value for detecting a signal.

The signal detection unit 190 determines in step S380 whether the vector c(j) is greater than the second threshold value. If it is determined that the vector c(j) is greater than the second threshold value, the signal detection unit 190 detects the i-th signal in step S390. In this way, active signals $c(k_i)$, $i=1, \ldots, c$ are detected and cell identifiers (IDs) $(k_1, \ldots, k_c)$ for the signals are detected in step S400. Here, an index of a signal may be output as a cell identifier.

Figure 11:
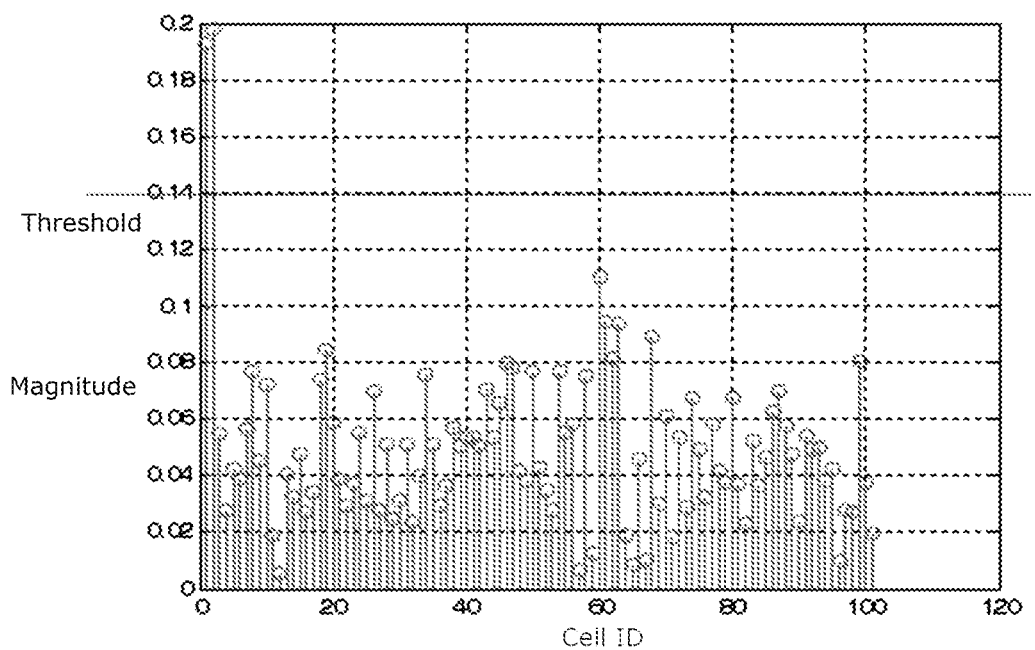
FIG. 11 is an illustration for performing signal detection using a second detected delay time according to an exemplary embodiment of the present invention.

FIG. 11 is an illustration for performing signal detection using a second detected delay time according to an exemplary embodiment of the present invention.

Parameters used in a simulation environment with signals as in FIG. 4 are as follow.

(1) The number of sub-channels N: 1024
(2) The number of cell ID Nc: 101
(3) The transmitted cell ID: 1, 2
(4) Channel coefficient hi=1+(random+j*random)*0.01, i=1, 2
(5) The number of frames that are used in configuring matrix: 100, i.e., 100*5 msec=500 msec The parameter may be the applied to the above described exemplary embodiment of the present invention.

Referring to FIG. 11, it is shown that signals transmitted from cells and signals not transmitted from the cells are distinguished distinctly each other and further signals transmitted from cells are exactly detected.

According to exemplary embodiments of the present invention, initial synchronization and signals can be effectively detected even in a poor channel environment with a low signal-to-noise ratio because signal processing is performed using block data processing.

Moreover, an efficient system with a high degree of freedom can be realized because variable block data signal processing is performed, and a high-quality system can be realized by selecting an algorithm suitable for the characteristics of an input signal because various algorithms can be applied to the primary eigenvector.

Furthermore, a system can be economically implemented since various high-speed block data signal processing algorithms can be applied, and a system capable of selecting the probability of detection or non-detection of a certain signal can be implemented because a threshold depending upon background noise level can be adjusted according to conditions.

In addition, various processing algorithms can be used because a block data processing algorithm is used, and fast initial synchronization detection and signal detection are enabled by applying a signal processing algorithm, thereby realizing a high-speed and high-quality communication system.

While the invention has been shown and described with reference to certain exemplary embodiments thereof, it will be understood by those skilled in the art various changes in form and details may be made therein without departing from the spirit and scope of the invention as defined by the appended claims and their equivalents.

What is claimed is:

1. A signal processing apparatus comprising:
   at least one processor;
   a vector/matrix generator configured to generate a cumulative matrix from a signal vector for each input frame;
   a primary eigenvector extractor configured to extract a primary eigenvector from the cumulative matrix output from the vector/matrix generator;
   a correlation vector calculator configured to:
      calculate a correlation value between a time transition matrix and the primary eigenvector output from the primary eigenvector extractor, wherein the time transition matrix is generated by shifting a reference matrix, and
      output a vector of the calculated correlation value;
   a time delay detector configured to:
      detect a synchronization time by comparing a maximum value of the vector output from the correlation vector calculator with a first threshold value, and
      output a delay time value from the detected synchronization time;

a time delay vector calculator configured to:
  calculate a correlation value between a reference transition matrix which is generated by delaying the reference matrix by the delay time value and the primary eigenvector, and
  output a value of an output vector; and
a signal detector configured to detect current synchronization and a signal by comparing the value of the output vector with a second threshold value.

2. The apparatus of claim 1, further comprising:
a signal collector configured to:
  generate the signal as a signal vector for each frame having a preset length, and
  output the signal to the vector/matrix generation unit;
a threshold value calculator configured to:
  calculate the first threshold value and the second threshold value by using electric power of the signal, and
  transmit the first threshold value to the time delay detector and the second threshold value to the correlation time delay detector; and
a reference transition matrix unit configured to:
  store a reference transition matrix previously generated for the signal, and
  generate the time transition matrix from the reference transition matrix and transmit the time transition matrix to the correlation vector calculator.

3. The apparatus of claim 1, wherein the vector/matrix generator generates a cumulative vector using the signal vector of the input frame and generates the cumulative matrix from the cumulative vector.

4. The apparatus of claim 3, wherein the primary eigenvector extractor generates a matrix from the cumulative vector by using at least one of algorithms including Eigenvalue Decomposition (EVD), Singular Value Decomposition (SVD), LU Decomposition (LUD), QR Decomposition (QRD), Cholesky Decomposition, Schur Decomposition, or Biconjugate Decomposition.

5. The apparatus of claim 1, wherein the primary eigenvector extractor is configured to extract, as the primary eigenvector, an eigenvector having a largest eigenvalue among the eigenvectors obtained by applying a predetermined algorithm to the cumulative matrix.

6. A signal processing method comprising:
obtaining a cumulative matrix from a vector signal for each frame generated and input from a signal;
extracting a primary eigenvector from the cumulative matrix;
calculating a maximum value of a correlation vector from the primary eigenvector;
detecting a time delay by comparing the maximum value of the correlation vector with a first threshold value;
calculating a delay correlation vector from the time delay; and
detecting synchronization and signals by comparing the delay correlation vector with a second threshold value.

7. The method of claim 6, further comprising:
prior to the obtaining of the cumulative matrix, converting an input signal into the vector signal for each frame.

8. The method of claim 7, wherein the obtaining of the cumulative matrix comprises:
generating a cumulative vector from the vector signal;
mapping the cumulative vector into the cumulative matrix; and
decomposing the mapped cumulative matrix.

9. The method of claim 8, further comprising obtaining the primary eigenvector from the decomposed cumulative matrix.

10. The method of claim 8, further comprising:
calculating the first threshold value and the second threshold value by calculating noise power using the cumulative vector.

11. The method of claim 6, wherein the calculating of the maximum value of the correlation vector comprises:
multiplying the primary eigenvector by a reference matrix and a time transition matrix to output the correlation vector; and
calculating the maximum value of the correlation vector by using a maximum correlation calculation process.

12. The method of claim 11, wherein the time transition matrix comprises a matrix generated from the signal.

13. The method of claim 6, wherein the detecting of the time delay comprises:
comparing the first threshold value with the maximum value of the correlation vector; and
if the maximum value of the correlation vector is greater than the first threshold value, detecting a delay time value.

14. A signal processing apparatus comprising:
at least one processor;
a vector/matrix generator configured to generate a cumulative matrix by converting signal vectors for frames into cumulative vectors, and map the converted cumulative vectors into the cumulative matrix;
a primary eigenvector extractor configured to extract a primary eigenvector from among eigenvectors corresponding to the cumulative matrix output from the vector/matrix generator;
a correlation vector calculator configured to:
  calculate correlation values between a preset reference matrix including characteristic information of a transmitted signal and the primary eigenvector, and output vectors of the calculated correlation values; and
a signal detector configured to detect current signals by comparing the vectors of the calculated correlation values and a preset threshold value.

15. The apparatus of claim 14, further comprising:
a threshold value calculator configured to calculate the preset threshold value by using electric power of a received signal.

16. The apparatus of claim 14, wherein the signal detector detects a vector of a calculated correlation value as a current signal when the vector of the calculated correlation value is greater than the preset threshold value.

17. The apparatus of claim 14, wherein the vector/matrix generator is configured to generate the cumulative vectors by accumulating signal vectors of previous frame numbers to each of the signal vectors to which frame numbers are sequentially assigned and generate the cumulative matrix having the cumulative vectors as elements.

18. A signal processing method comprising:
obtaining a cumulative matrix by converting signal vectors for frames into cumulative vectors, and mapping the converted cumulative vectors into the cumulative matrix;
extracting a primary eigenvector from among eigenvectors corresponding to the cumulative matrixes;
calculating correlation values between a preset reference matrix including characteristic information of a transmitted signal and the primary eigenvector, and outputting vectors of the calculated correlation values; and detecting signals by comparing the vectors of the calculated correlation values and a preset threshold value.

19. The method of claim 18, wherein the obtaining of cumulative matrixes comprises generating the cumulative vectors by accumulating signal vectors of previous frame numbers to each of the signal vectors to which frame numbers are sequentially assigned and generating the cumulative matrix having the cumulative vectors as elements.

20. The method of claim 18, wherein the detecting of the signals comprises:
- comparing the vectors of the calculated correlation values and the preset threshold value;
- detecting an index of a vector of a calculated correlation value when the vector of the calculated correlation value is greater than the preset threshold value;
- outputting a signal of the index; and
- outputting the index as a cell identifier.

* * * * *